United States Patent Office 3,085,153
Patented Apr. 9, 1963

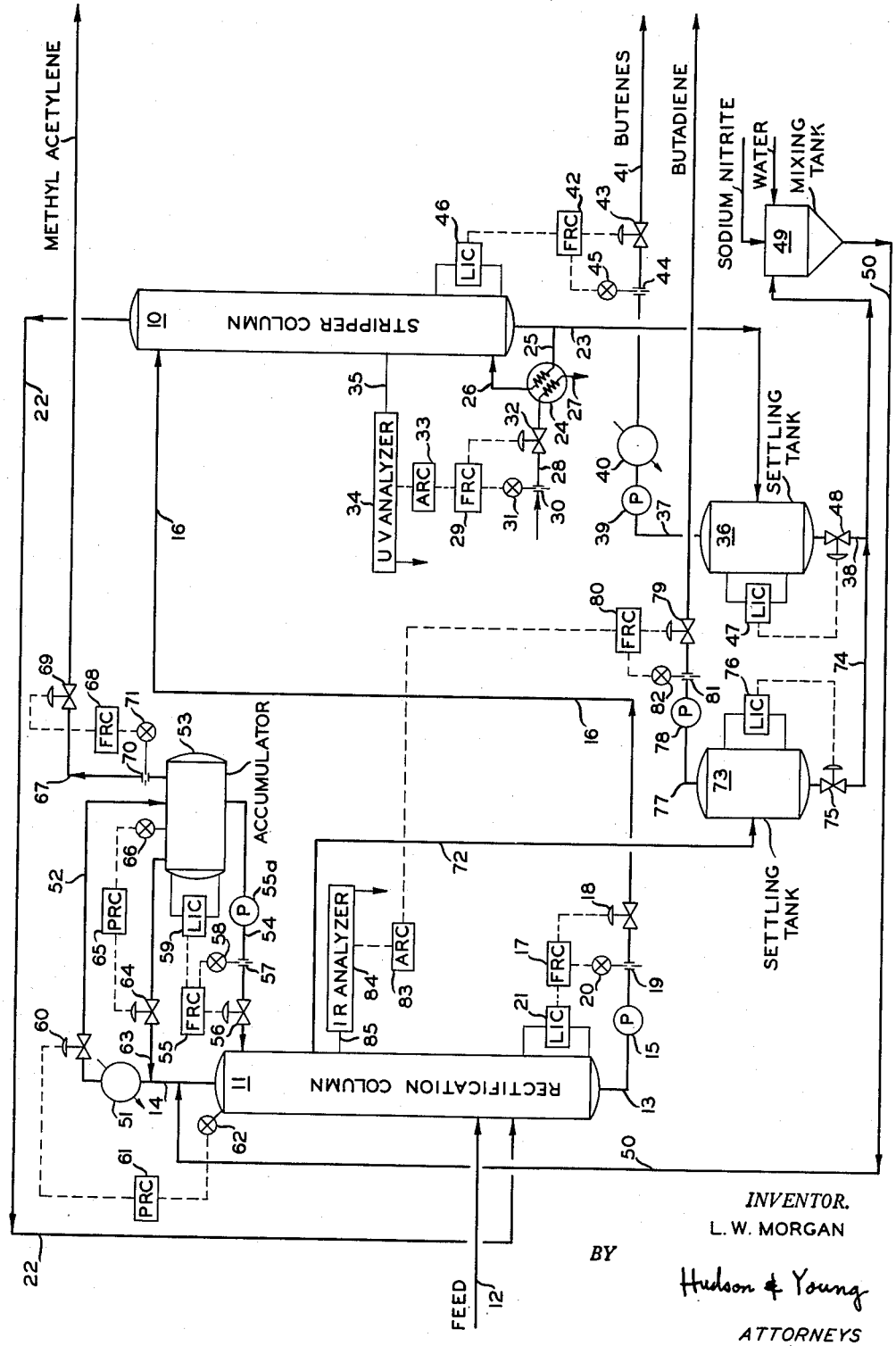

3,085,153
CONTROL SYSTEM FOR SEPARATION
PROCESSES
Lyman W. Morgan, Golden, Colo., assignor to Phillips
Petroleum Company, a corporation of Delaware
Filed Apr. 13, 1959, Ser. No. 805,902
13 Claims. (Cl. 250—43.5)

This invention relates to the control of separation processes. In one aspect, this invention relates to a control system which automatically controls a separation process so as to produce two products of specification quality. In another aspect, this invention relates to a method for controlling the operation of fractionation columns in a stable manner. In still another aspect, this invention relates to a method of and apparatus for controlling the separation of butadiene-1,3 from butene-2 (both high and low boiling isomers) in the presence of acetylenes, whereby butadiene-1,3 and butene-2 products of specification purity are obtained.

In the petroleum and petrochemical industries, considerable work has been directed in recent years towards the development of more efficient separation processes. One of the most important aspects of this work concerns improvement in the control of separation processes so as to obtain a product stream having a specified purity. In the prior art separation processes which utilize fractionation columns, it is conventional to control the processes so that one stream only of specification quality is recovered as a product, the purity of the other product being in effect disregarded. For example, when the desired product is taken overhead from a frationation column, the column is controlled so that the overhead product has the desired purity while the bottoms product has the composition resulting from the removal of all the remaining feed components as bottoms product.

When processing certain feed streams which are essentially binary system, it should be desirable to effect a separation so as to recover two products of specification quality. Such a separation would eliminate the necessity for further treatment of one of the column product streams as required in conventional processes, thereby effecting a substantial saving in operational cost. Unfortunately, control of the several streams of a fractionation column often results in unstable operation wherein one control means exerts a substantial effect on another control means regulating the column. Therefore, it is desirable that the relationship between plural control means regulating a single fractionation column be such as to maintain stable column operation.

The separation of butadiene-1,3 from the butenes-2 is one essentially binary system wherein problems are encountered in producing butadiene and butenes products of the desired purity. This feed stream normally contains small percentages of acetylenes, such as methyl acetylene, vinyl acetylene, and ethyl acetylene. The methyl acetylene is more volatile than either butadiene or the butenes so that it is difficult to produce a butadiene product of a purity of not less than 98 mol percent containing not more than 0.1 weight percent of the total acetylenes. In addition to the acetylenes, this feed stream also contains small amounts of butene-1, isobutylene, and normal butane along with the cis and trans isomers of butene-2. These latter compounds, particularly the trans isomer of butene-2, have nearly the same volatility as butadiene-1,3 under these separating conditions; however, through the proper selection of the reflux to feed ratio and the number of trays employed in the fractionating column, the desired degree of separation between butadiene and the butenes-2 can be obtained. The vinyl and ethyl acetylenes also complicate this separation even though these components are less volatile than butadiene because these acetylenes act in a non-ideal fashion in the presence of butadiene and the butenes under distillation conditions so that their volatility relative to butadiene is not constant but is some complex function of composition.

Accordingly, it is an object of this invention to provide a method for controlling separation processes.

Another object of this invention is to provide a control system for regulating fractionating columns to produce two products of specification quality.

Another object of this invention is to provide a method for controlling separation processes with plural control means in a stable manner.

Another object of this invention is to provide a method and improved means for controlling the separation of butadiene from butenes-2 and acetylenes.

Other objects and advantages of this invention will be apparent to one skilled in the art upon studying this disclosure, including the attached drawing.

The drawing is a schematic view of fractionation apparatus including the analysis and control apparatus of this invention.

Broadly, this invention contemplates controlling process variables in both the upper and lower portions of a separation means in accordance with the concentration in those localities of the products withdrawn from the opposite ends of the separation means. The separation means, having a stripping zone in the lower portion thereof and a rectification zone in the upper portion thereof, is operated with substantially total reflux, uncondensed impurity vapors being taken overhead and the more volatile desired product is withdrawn as a side-draw product from the rectification zone at a point intermediate between the points of introduction of feed and the introduction of reflux into the rectification zone.

The concentration of bottoms product removed from the stripping zone present in a first sample stream continuously withdrawn from the rectification zone is determined in an automatic analyzer means and the rate of withdrawal of said side-draw product stream in said first sample stream is adjusted to maintain the concentration of said bottoms product substantially constant. Also, the concentration of side-draw product stream present in a second sample stream continuously withdrawn from the stripping zone is determined in another automatic analyzer means and either the rate of heat introduction into said stripping zone or the rate of bottoms product withdrawal from said stripping zone adjusted to maintain the concentration of said side-draw product in said second sample stream constant.

Operation of the separation means with substantially total reflux and recovering the "overhead product" as a side-draw fraction are particular features of this invention and provide means for controlling the separation means in a stable manner to produce two product streams of specification quality.

Referring to the drawing, there is illustrated a fractional distillation means comprising stripper column 10 and rectification column 11 of any suitable design employing vapor-liquid contacting means, such as bubble cap plates or the like. Together, columns 10 and 11 constitute a single fractionation column; however, because of the large number of vapor-liquid contacting trays used, it is more convenient to place the stripping and rectification zones in separate columns. The essentially binary feed mixture containing a minor amount of a third component to be separated is charged to column 11 through line 12. Within rectification column 11, the feed mixture is separated into a rectification bottoms fraction which is withdrawn through line 13 and an overhead fraction which is withdrawn through line 14.

The rectification bottoms fraction is forced by pump 15 from line 13 through line 16 into the upper portion of stripping column 10. The rate at which the rectification bottoms fraction is withdrawn from the bottom of rectification column 11 is controlled by flow recorder controller 17 which adjusts valve 18 in line 16 in accordance with the pressure drop across flow restriction 19. Differential pressure transmitter 20 supplies a signal from flow restriction 19 to flow recorder controller 17. The setting of flow recorder controller 17 is adjusted by level interface controller 21 in response to the liquid level in the lower portion of rectification column 11. The rectification bottoms fraction introduced into column 10 through line 16 is separated into a stripper overhead fraction which is removed through line 22 and returned to the lower portion of the rectification column 11 and a stripper bottoms fraction which is withdrawn from stripping column 10 through line 23. Heat is supplied to the lower portion of stripping column 10 by circulation of a portion of the stripper bottoms fraction withdrawn through line 23 through heat exchanger 24 by means of lines 25 and 26. Steam is supplied through line 28 to heat exchanger 24 at a rate controlled by flow recorder controller 29 which receives a signal from flow restriction 30 in line 28 by means of differential pressure transmitter 31 and adjusts valve 32 in line 28. The set point of flow controller 29 is adjusted by analyzer recorder controller 33 which is adjusted by ultraviolet analyzer 34 in a manner to be described more fully hereinafter. A sample from the lower portion of stripping column 10 is withdrawn through line 35 and supplied to ultraviolet analyzer 34 for this purpose.

The stripping column bottoms fraction withdrawn through line 23 comprises the relatively heavy component of the binary feed mixture and constitutes one of the products of specification quality of the separation process. In a separation process wherein a polymerization inhibitor such as sodium nitrite is used, the inhibitor is removed in settling tank 36 from which the bottoms product is withdrawn through line 37 and the inhibitor is withdrawn through line 38. Pump 39 in line 37 provides for flow of the bottoms product from settling tank 36 through cooler 40 and then from the process through line 41. The rate of withdrawal of stripper column bottoms fraction through line 23, and therefore the rate of withdrawal of the bottoms product through line 41, is controlled by flow recorder controller 42 which adjusts the positioning of valve 43 in line 41 in accordance with the pressure drop across flow restriction 44 transmitted to flow recorder 42 by means of differential pressure transmitter 45. Flow recorder controller 42 is reset by level interface controller 46 in response to the liquid level in the lower portion of stripper column 10.

The rate of withdrawal of polymerization inhibitor from settling tank 36 is controlled by level interface controller 47 which adjusts valve 48 in line 38. The recovered polymerization inhibitor is introduced into sodium nitrite mix tank 49 into which sodium nitrite and water are introduced to provide additional polymerization inhibitor for circulation from tank 49 through line 50 into rectification overhead fraction withdrawal line 14.

The vapors and/or gases comprising the relatively light components of the feed mixture supplied to rectification column 11 pass from the upper portion of column 11 through line 14 to condenser 51 where they are condensed. The resulting condensate together with any other components are directed through line 52 into reflux accumulator 53. The condensate collected in accumulator 53 is discharged therefrom through line 54 and circulated by pump 55a back into the upper portion of column 11 as reflux. The rate at which condensate is returned to column 11 as reflux is controlled by flow rate controller 55 which adjusts valve 56 in line 54 in accordance with a signal developed across flow restriction 57 and transmitted by differential pressure transmitter 58 to flow recorder 55. Level interface controller 59 attached to accumulator 53 resets flow recorder controller 55 in accordance with the liquid level in accumulator 53. As a result, reflux is supplied to the upper portion of column 11 at a rate sufficient to maintain the desired liquid level in accumulator 53. In order to maintain the desired operating pressure in column 11, valve 60 in line 52 is adjusted by pressure recorder controller 61 in accordance with pressures transmitted by differential pressure transmitter 62. The pressure in accumulator 53 is adjusted by the flow of overhead fraction through line 63, bypassing condenser 51, at a rate determined by the opening of control valve 64 in line 63 as adjusted by pressure recorder controller 65 in accordance with the signal transmitted by pressure differential transmitter 66. Uncondensed or overhead gases and/or vapors are withdrawn from the top of accumulator 53 through line 67 at a rate controlled by flow recorder controller 68 which adjusts valve 69 in accordance with the pressure drop across flow restriction 70 transmitted by differential pressure transmitter 71.

The second product of specification quality is withdrawn from the upper part of rectification column 11 through line 72 and introduced into settling tank 73 for the separation of any polymerization inhibitor which may be therein. In effect, settling tank 73 serves as a storage zone. Polymerization inhibitor removed in settling tank 73 is passed through line 74 to sodium nitrite mixing tank 49 at a rate determined by the positioning of valve 75 which is controlled by level interface controller 76 connected to settling tank 73. The side-draw product, free from polymerization inhibitor, is withdrawn from settling tank 73 through line 77 by pump 78 and recovered as the second product of specification quality of the process. The rate of withdrawal of side-draw product through line 77 is determined by the positioning of valve 79 which is controlled by flow recorder controller 80 in accordance with the pressure drop developed across flow restriction 81 and transmitted by differential pressure transmitter 82. Flow recorder controller 80 is adjusted by analyzer recorder controller 83 which is adjusted by infrared analyzer 84 in a manner to be described hereinafter. A sample is continuously withdrawn from the upper portion of rectification column 11 through line 85 and passed through infrared analyzer 84 in order to determine the concentration of the stripper column bottoms fraction present therein.

In order to attain a better understanding of the invention, the fractional distillation process will be described with relation to a specific separation such as the separation of butadiene from butenes-2 and acetylenes. Accordingly, the mixture is charged to column 11 through line 12 and butadiene containing methyl acetylene is taken overhead through line 14. All the butadiene is condensed by condenser 51 and collected in accumulator 53 to be recycled as total reflux into the top of rectification column 11 through line 54. The gaseous methyl acetylene is withdrawn through line 67. Butadiene of a purity not less than 98 mol percent and containing not more than 0.1 weight percent of total acetylenes is withdrawn from rectification column 11 through line 72 as a side-draw product. Rectification column 11 is operated with a top temperature of 125° F. and a pressure of 85 p.s.i.a. The column is constructed with 75 bubble type trays with the introduction of the feed provided on tray 10, numbering from the bottom of the column, and the withdrawal of side-draw product through line 72a from a tray selected from those numbered 50 through 60. Sample withdrawal line 85 removes a sample from a tray numbered from 35 through 55 for analysis in infrared analyzer 84. Thus, as shown in the drawing, sample is withdrawn from rectification column 11 from a tray adjacent the tray from which the side-draw product is withdrawn through line 72.

The bottoms fraction from rectification column 11 is passed through line 13 and line 16 into the top of stripper column 10. A bottoms fraction, comprising primarily butenes 2, including the cis and trans isomers, as well as acetylenes other than methyl acetylenes and compounds boiling below butadiene, are withdrawn from the bottom of stripper column 10. Heat for the distillation process is introduced into the bottom of stripper column 10 by recycling a portion of the bottoms products through heat exchanger 24 in heat exchange with steam or any refinery stream at elevated temperature. A desired level of liquid is maintained in the bottom of stripper column 10 by level indicating controller 46 which adjusts flow rate controller 42 controlling the withdrawal of bottoms product through line 41. The overhead fraction from stripper column 10 is withdrawn through line 22 and returned to the bottom of rectification column 11.

In operation, a sample is continuously withdrawn from rectification column 11 through line 85 and passed through infrared analyzer 84. In analyzer 84, a beam of infrared radiation is passed through the sample stream and the radiation absorbed by the sample stream is measured to obtain an indication of the concentration of butenes present. Infrared analyzer 84 acts through automatic recorder controller 83 to adjust the setting of flow rate controller 80 and thereby control the rate of withdrawal of side-draw product, i.e. butadiene, from rectification column 11 in accordance with the concentration of butenes within rectification column 11 at the point where said butadiene is withdrawn therefrom. Whenever the concentration of butenes becomes greater than the preselected value, infrared analyzer 84 acts to reduce the withdrawal of butadiene product through line 72 by the closing of valve 79 to thereby increase the flow of liquid down rectification column 11 and reduce the concentration of butene in the vapor passing upwardly. Settling tank 73, located between side-draw line 72 and product removal line 77, serves to isolate valve 79 as the point of control from sample line 85 as the point of measurement, thereby promoting the stability of the system.

In stripping column 10, which also contains 75 bubble cap trays, a sample is continuously withdrawn from a tray numbered in the range of from 5 to 13 and passed through line 35 to ultraviolet analyzer 34. In ultraviolet analyzer 34, the concentration of butadiene in the bottom portion of stripper column 10 is measured and the rate of introduction of heat into stripper column 10 is controlled by the flow of high temperature fluid through heat exchanger 24. Thus, if the concentration of butadiene in the lower portion of stripper column 10 increases above a preselected value UV analyzer 34 acts through analyzer recorder controller 33 to adjust the setting of flow recorder controller 29 to thereby control the opening of valve 32 which regulates the flow of steam through heat exchanger 34. An increase in temperature in the lower part of stripper column 10 increases the vaporization of butadiene and thereby reduces the concentration of this material in the bottoms product. In this separation, stripper column 10 is normally operated with a bottom temperature of 155° F. and a bottom pressure of 100 p.s.i.a.

If desired, ultraviolet analyzer 34 can be employed to control the rate of withdrawal of bottoms product from stripper column 10 through line 23 by connecting the output of analyzer recorder controller 33 to flow recorder controller 42. In this revised system, level indicating controller 46 is used to control the introduction of heat into the bottom of stripper column 10 by connecting the output of level indicating controller 46 to flow recorder controller 29.

The operation of column 11 with substantially total reflux and withdrawal of butadiene as a side stream product results in an instrumentation system having considerable stability. The location of settling tank 73 as a storage zone between the point of control of the rate of removal of the side-draw product and the point of measurement of the impurity therein serves to promote the stability of the process. If desired, the stability of the process can be further increased by changing analyzer recorder controller 83 and 33 to give different speeds of response. Thus, analyzer recorder controller 83 can be adjusted to have a slower response action to changes in concentration of butenes in the top of rectification column 11 and analyzer recorder controller 33 can be adjusted to give faster response to changes in butadiene concentration measured in the bottom of stripper column 10.

Although the fractionation column of the embodiment shown in the drawing is constructed as two separate columns, one comprising the rectification zone and the other comprising the stripping zone, this column can be constructed as a single unit if desired. However, in view of the large number of trays required for the separation described in the drawing, it is preferred to place the rectification and stripping zones in separate columns. Since no additional heat is introduced into the bottom of rectification column 11, it can be considered that rectification column 11 and stripper column 10 are a single unit.

As will be apparent to one skilled in the art possessing this specification, the invention is not limited to the use of an infrared analyzer with rectification column 11 and an ultraviolet analyzer with stripper column 10. Any automatic analyzing means, including a chromatographic analyzer, can be used provided the analyzer produces either an electrical or pneumatic signal indicative of one component in the sample stream. Further, the invention is not limited to only one infrared analyzer and one ultraviolet analyzer but two of either type analyzers can be used depending upon the feed material being separated. Any commercially available analyzers can be used such as the infrared analyzer Model No. 105 manufactured by the Perkin-Elmer Corporation of Norwalk, Connecticut, and the Phillips-Consolidated ultraviolet analyzer, Type 38-401, manufactured by the Consolidated Electrodynamics Corporation of Pasadena, California. Also, the infrared analyzer described in U.S. Patent 2,579,825 and the ultraviolet analyzer described in U.S. Patent 2,764,692 can be used. The Perkin-Elmer infrared analyzer produces an electrical signal which, in the embodiment described in the drawing, can be transduced to a pneumatic signal by use of a commercially available transducer such as the Foxboro E.M.F. 2 pneumatic transmitter manufactured by the Foxboro Company of Foxboro, Mass. Preferably, the analyzer recorder controller is Model 54-1-1-T-S-58P-4 manufactured by the Foxboro Company of Foxboro, Massachusetts.

The other control instruments as described herein are commercially available items of manufacture and it is not intended that the invention be limited to any specific type of instrument. For example, the flow recorder controller can be a Model 54-1-1-T-S-58-P-4, the pressure transmitter can be a Type 13A $d/p$ cell transmitter and the level indicator controller can be a Model M-58-4 controller, all manufactured by the Foxboro Company of Foxboro, Massachusetts.

It is to be understood that the invention is not limited to the specific separation of butadiene from butenes described in the drawing, but is applicable to the separation of any essentially binary mixture from which one product can be recovered as a side-draw stream. For example, the invention can be advantageously used in the separation of mixtures of isopentane and normal pentane, ethylene and ethane, propylene and propane, and the like. The instant invention can also be used in the separation of multi-component mixtures containing components which can be divided into two classes or groups of materials, the concentration of each group being determinable by the available analyzing equipment.

Specific Example

A butadiene-butene feed was separated in the system shown in the drawing to yield a butadiene side-draw product and a butenes bottom product. Rectification column 11 was operated with a top temperature of 125° F. and a top pressure of 85 p.s.i.a. The feed stream entered rectification column 11 through line 12 onto tray No. 10 and the side-draw product was withdrawn from tray No. 60. The column contained 75 trays of a diameter of 7 feet spaced 24 inches apart. The sample supplied to the infrared analyzer 84 was withdrawn from tray No. 50. Stripper column 10 was the same construction as rectification column 11 and was operated with a bottom temperature of 155° F. and a bottom pressure of 100 p.s.i.a. The rectification bottoms product passing through line 16 was introduced into column 10 on tray No. 75 and the sample supplied to ultraviolet analyzer 34 was withdrawn from tray No. 9. The stream flow and analysis is given in the following table:

|  | Feed | Butenes Product | Methyl Acetylene Stream | Butadiene Product |
| --- | --- | --- | --- | --- |
| Stream Number | 12 | 41 | 67 | 77 |
| Methyl Acetylene | 19 |  | 18 | 1 |
| Isobutane | 5 |  |  | 5 |
| Butene-1 | 5 |  |  | 5 |
| Butadiene | 6,356 | 63 | 8 | 6,285 |
| Trans-Butene-2 | 236 | 227 |  | 9 |
| Cis-Butene-2 | 720 | 720 |  |  |
| Vinyl Acetylene | 13 | 13 |  | Trace |
| Ethyl Acetylene | 50 | 49 |  | 1 |
| Pentene | 25 | 25 |  |  |
| Pentadiene | 98 | 98 |  |  |
| Acetaldehyde | 18 | 14 |  | 4 |
| Heavier Aldehydes | 2 | 2 |  |  |
| Pentanes | 25 | 25 |  |  |
| Total, lb./hr | 7,572 | 1,236 | 26 | 6,310 |

The above figures are given in pounds per hour, based on condensed liquids.

Reasonable variation and modification are possible within the scope of the foregoing disclosure, drawing and the appended claims to the invention, the essence of which is that there have been provided an improved system for controlling process variables in both the upper and lower portions of a separation means in accordance with the concentration in those localities of the products withdrawn from the opposite ends of the separation means, and an improved method for the separation of essentially binary mixtures into two products of specification purity.

I claim:

1. In a process for separating in a separation zone, an essentially binary feed mixture containing a small amount of a third component into two product streams of specification quality wherein a stream comprising said third component is taken overhead from said zone and in which the process variables include the rate of kettle product withdrawal from said zone, the rate of heat introduction into said zone, and the rate of side-draw product withdrawal from said zone, the improvement comprising continuously withdrawing a first sample stream from an upper portion of said zone, analyzing said first sample stream to determine the concentration of one of the components of said mixture, adjusting the rate of side-draw product withdrawal from the upper portion of said zone so as to maintain the composition of said first sample stream constant with respect to the component being measured, continuously withdrawing a second sample stream from a lower portion of said zone, analyzing said second sample stream to determine the concentration of the other component of said feed mixture, and adjusting another of said process variables so as to maintain the composition of said second sample stream constant with respect to the component being measured.

2. The process of claim 1 wherein said process variable adjusted so as to maintain the composition of said second sample stream constant is said rate of heat introduction into said separation zone.

3. The process of claim 1 wherein said process variable adjusted so as to maintain the composition of said second sample stream constant is said rate of kettle product withdrawal from said separation zone.

4. In a process for separating in a separation zone, a feed mixture comprising essentially butadiene and butenes containing a small amount of methyl acetylene into butadiene and butenes streams of specification purity wherein a stream comprising said methyl acetylene is taken overhead from said zone and in which the process variables include the rate of kettle product withdrawal from said separation zone, the rate of heat introduction into said separation zone, and the rate of side-draw product withdrawal from said separation zone, the improvement comprising, continuously withdrawing a first sample stream from an upper portion of said separation zone, analyzing said first sample stream to determine the concentration of butenes therein, adjusting the rate of butadiene withdrawal as side-draw product from the upper portion of said separation zone so as to maintain the concentration of said butenes in said first sample stream constant, continuously withdrawing a second sample stream from the lower portion of said zone, analyzing said second sample stream to determine the concentration of butadiene therein, and adjusting another of said process variables so as to maintain the concentration of said butadiene in said second sample stream constant.

5. The process for separating in a separation zone, a feed mixture comprising essentially butadiene and butenes containing a small amount of methyl acetylene into butadiene and butenes streams of specification quality wherein a stream comprising said methyl acetylene is taken overhead from said zone and in which the process variables include the rate of kettle product withdrawal from said separation zone, the rate of heat introduction into said separation zone, and the rate of side-draw product withdrawal from said separation zone, the improvement comprising continuously withdrawing a first sample stream from an upper portion of said separation zone, passing a beam of infrared radiation through said first sample stream, measuring the radiation adsorbed by said first sample stream which is characteristic of the radiation adsorbed by said butenes, adjusting the rate of butadiene withdrawal as side-draw product from the upper portion of said separation zone so as to maintain the concentration of said butenes in said first sample stream constant, continuously withdrawing a second sample stream from a lower portion of said zone, passing a beam of ultraviolet radiation through said second sample stream which is characteristic of the radiation adsorbed by said butadiene, and adjusting another of said process variables so as to maintain the concentration of said butadiene in said second sample stream constant.

6. A process for separating an essentially binary feed mixture containing a small amount of a third component into two product streams of specification quality which comprises passing said feed mixture into a separation zone, withdrawing an overhead fraction comprising said third product from an upper portion of said separation zone, introducing substantially all said withdrawn overhead fraction into an upper portion of said separation zone as reflux, withdrawing an intermediate fraction from an upper portion of said separation zone below the point of the introduction of said overhead fraction as one product of the process, withdrawing a bottoms fraction from a lower portion of said separation zone as the second product of the process, introducing heat into said lower portion of said separation zone, continuously withdrawing a first sample stream from an upper portion of said zone, analyzing said first sample stream to determine the concentration of the product of the bottoms fraction from said separation zone, adjusting the rate of withdrawal of said intermediate fraction from said separation zone so as to maintain the composition of said first sample stream constant with respect to the concentration of the product being measured, continuously withdrawing a second sample stream from the lower portion of said separation zone, analyzing said second sample stream to determine the concentration of the product of said intermediate fraction therein, and adjusting one of the rate of flow of said bottoms fraction from said separation zone and the rate of heat introduction into said separation zone so as to maintain the composition of said second sample stream constant with respect to the concentration of the product being measured.

7. A process for separating a feed mixture of butadiene and butenes containing a small amount of methyl acetylene into two product streams of specification quality which comprises passing said feed mixture into a rectification zone, withdrawing an overhead fraction of butadiene and methyl acetylene from an upper portion of said rectification zone, introducing substantially all of said withdrawn overhead fraction into an upper portion of said rectification zone as reflux, withdrawing methyl acetylene as an overhead fraction from said rectification zone, withdrawing an intermediate fraction of butadiene from an upper portion of said rectification zone below the point of the introduction of said overhead fraction as one product of the process, withdrawing a bottoms fraction from said rectification zone, introducing said last withdrawn bottoms fraction into the upper portion of a stripping zone, introducing heat into the lower portion of said stripping zone, withdrawing an overhead fraction from said stripping zone, introducing said last withdrawn overhead fraction into the lower portion of said rectification zone, withdrawing a bottoms fraction of butenes from a lower portion of said stripping zone as the second product the process, continuously withdrawing a first sample stream from said rectification zone, analyzing said first sample stream to determine the concentration of butenes therein, adjusting the rate of withdrawal of said intermediate fraction of butadiene from said rectification zone so as to maintain the concentration of butenes in said first sample stream constant, continuously withdrawing a second sample stream from said stripping zone, analyzing said second sample stream to determine the concentration of butadiene therein, and adjusting the rate of heat introduction into said stripping zone so as to maintain the composition of butenes in said second sample stream constant.

8. A process for separating a feed mixture of butadiene and butenes containing a small amount of methyl acetylene into two product streams of specification quality which comprises passing said feed mixture into a rectification zone, withdrawing an overhead fraction of butadiene and methyl acetylene from an upper portion of said rectification zone, introducing substantially all said withdrawal overhead fraction into an upper portion of said rectification zone as reflux, withdrawing an intermediate fraction of butadiene from an upper portion of said rectification zone below the point of introduction of said overhead fraction as one product of the process, withdrawing a bottoms fraction from said rectification zone, introducing said last withdrawn bottoms fraction into the upper portion of a stripping zone, introducing heat into the lower portion of said stripping zone, withdrawing an overhead fraction from said stripping zone, introducing said last withdrawn overhead fraction into the lower portion of said rectification zone, withdrawing a bottoms fraction of butenes from a lower portion of said stripping zone as the second product of the process, continuously withdrawing a first sample stream from said rectification zone, passing a beam of infrared radiation through said first sample stream, measuring the radiation adsorbed by said first sample stream which is characteristic of the radiation adsorbed by said butenes, adjusting the rate of butadiene withdrawal as side stream product from the upper portion of said rectification zone so as to maintain the concentration of said butenes in said first sample stream constant, continuously withdrawing a second sample stream from said stripping zone, passing a beam of ultraviolet radiation through said second sample stream which is characteristic of the radiation adsorbed by said butadiene, and adjusting another of said process variables so as to maintain the concentration of said butadiene in said second sample stream constant.

9. A system for separating an essentially binary feed mixture into two product streams of specification quality comprising, in combination, fractionation means having a stripping zone and a rectification zone, means for introducing said feed mixture into said rectification zone, means for withdrawing an overhead fraction from the upper portion of said rectification zone, means for introducing substantially all said withdrawn overhead fraction into an upper portion of said rectification zone as reflux, means for introducing heat into the bottom of said stripping zone, means for withdrawing a side-draw product from an upper portion of said rectification zone, means for withdrawing a bottoms fraction from the lower portion of said stripping zone as kettle product, means for removing a first sample stream from said rectification zone, first means for analyzing said first sample stream to determine the concentration therein of said bottoms product, first control means responsive to said first analyzing means for adjusting said means for withdrawing said side-draw product in said first sample stream at a preselected value, means for removing a second sample stream from said stripping zone, second means for analyzing said second sample stream to determine the concentration therein of said side-draw product, and second control means responsive to said second analyzing means for adjusting one of said means for withdrawing said bottoms fraction from said stripping zone and said means for introducing heat into said stripping zone so as to maintain the concentration of said side-draw product in said second sample stream at a preselected value.

10. The system of claim 9, wherein said second control means responsive to said second analyzing means adjusts said means for introducing heat into said stripping zone.

11. The system of claim 10 wherein said second control means responsive to said second analyzing means adjusts said means for withdrawing said bottoms fraction from said stripping zone.

12. The system of claim 9 wherein storage means are provided between said fractionation means and said first control means for receiving said side-draw product.

13. The system of claim 9 wherein said first control means comprises an infrared analyzer and said second control means comprises an ultraviolet analyzer.

References Cited in the file of this patent

UNITED STATES PATENTS

| | | |
|---|---|---|
| 2,063,140 | Allison | Dec. 8, 1936 |
| 2,386,831 | Wright | Oct. 16, 1945 |
| 2,459,404 | Anderson | Jan. 18, 1949 |
| 2,486,929 | Dean | Nov. 1, 1949 |
| 2,696,464 | Mathis et al. | Dec. 7, 1954 |
| 2,709,678 | Berger | May 31, 1955 |
| 2,737,469 | Anderson et al. | Mar. 6, 1956 |
| 2,764,536 | Hutchins | Sept. 25, 1956 |
| 2,882,693 | Clay | Apr. 21, 1959 |